United States Patent
Williams et al.

[11] 3,744,912
[45] July 10, 1973

[54] HOLOGRAPHIC THIN FILM ANALYZER

[75] Inventors: John R. Williams, Huntsville, Ala.; Burnice N. Norden, Gaithersburg, Md.

[73] Assignee: The United States of America as represented by the Administrator of the National Aeronautics and Space Administration, Washington, D.C.

[22] Filed: Aug. 30, 1971

[21] Appl. No.: 175,981

[52] U.S. Cl. .................. 356/108, 356/109, 350/3.5
[51] Int. Cl. ................................ G01b 9/02, G02b
[58] Field of Search .................... 356/106, 107, 109, 356/108; 350/3.5

[56] References Cited
UNITED STATES PATENTS

| | | | |
|---|---|---|---|
| 3,535,014 | 10/1970 | Kurtz et al. | 350/3.5 |
| 3,533,675 | 10/1970 | Brooks | 350/3.5 |
| 3,012,692 | 10/1971 | Kruppa | 356/108 |

OTHER PUBLICATIONS

"Difference Holography"; 7 Applied Optics 203, Collins.

*Primary Examiner*—Ronald L. Wibert
*Assistant Examiner*—Conrad Clark
*Attorney*—L. D. Wofford, Jr.

[57] ABSTRACT

A system for the analysis and measurement of thin films in which the light output of a laser is split into two beams, a first beam being focused to illuminate the entire area of a photographic plate and a second beam being columnated and directed through a relatively small portion of the photographic plate onto the sample having a film to be observed. The surface of the sample is positioned at a slight angle with respect to a plane normal to the second beam and the light reflected from the sample arrives back at the photographic plate in a region other than through which the second beam originally passed. By making two successive exposures during the deposition of material on the surface of the sample, holograms are recorded on the photographic plate. The plate is then developed and interference lines of the hologram provide a measurement of the film or material deposited between exposure.

4 Claims, 3 Drawing Figures

HOLOGRAPHIC THIN FILM ANALYZER

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates to the measurement and analysis of thin films and particularly to a system of this character which utilizes the production and analysis of holographic images, or holograms.

2. Description of the Prior Art

Heretofore the measurement of thin films has generally relied upon indirect measurements using some characteristic for measurement other than by direct observation of thickness. In one such method the object to which a film is to be applied is weighed, then the film applied and finally the object reweighed. The film thickness is then calculated from measured weight and an assumed density of the film. Of course, with this method it is necessary to know precisely the density of the film which, unfortunately, is not always known. This is particularly true where a film is the result of atmospheric contamination. In another method a beam of light is directed onto an object to be coated with a film and while the film is being applied a sample of light reflected from the object is monitored. Then by measuring this reflected light and assuming a reflective characteristic for the composition of the film, film thickness may be computed.

Neither of these prior methods have proved entirely satisfactory in that they rely upon assumptions which are not always known with sufficient accuracy. In the one case it must be assumed that density is precisely known and in both cases it must be assumed that the coating or films are uniformly applied, which is not an entirely reliable assumption.

SUMMARY OF THE INVENTION

It is an object of the present invention to provide an improved system for the measurement of thin films which is more accurate than previous such systems and is capable of making measurements during the process of application of a thin film to thus enable the accurately controlled production of a selected film thickness, These and other objects, features and advantages are embodied in the present invention in which the components and their arrangement are as follows. First, the object or sample to which a film is to be applied is placed within a vacuum enclosure and positioned to be viewed by a photographic plate. Light from a source of coherent light, such as a laser, is split into two beams, one beam of which is directed to illuminate the surface of the photographic plate and the other beam is colummated and directed onto a surface of the object, which surface is appropriately oriented to reflect the light onto the photographic plate. In accordance with one aspect of the invention the colummated beam would be small in cross section compared with the full surface of the photographic plate and would be directed through a portion of the photographic plate onto the object. The object, or observed surface of the object, is appropriately tilted to reflect a beam back to the photographic plate onto a region separated from the region of the plate through which the original beam passed. In accordance with still another aspect of the invention, and where the object to be viewed is transparent, a second image on a third discrete region of the photographic plate is obtained by placing a slightly tilted mirror behind the object and then light passing through the object is reflected back through the object to the photographic plate. By this latter configuration there is registered the effect of a double passage through the object. Holograms produced through successive exposures of the photographic plate, between which exposures a film of material is deposited on the object, provide a measure of film thickness. As a still further feature of the invention a face plate is interposed in the path of one of the beams and the phase shifted to twin exposures and thereby only changed conditions, or added thickness, is observed.

DESCRIPTION OF THE PREFERRED EMBODIMENT

Figure 1:
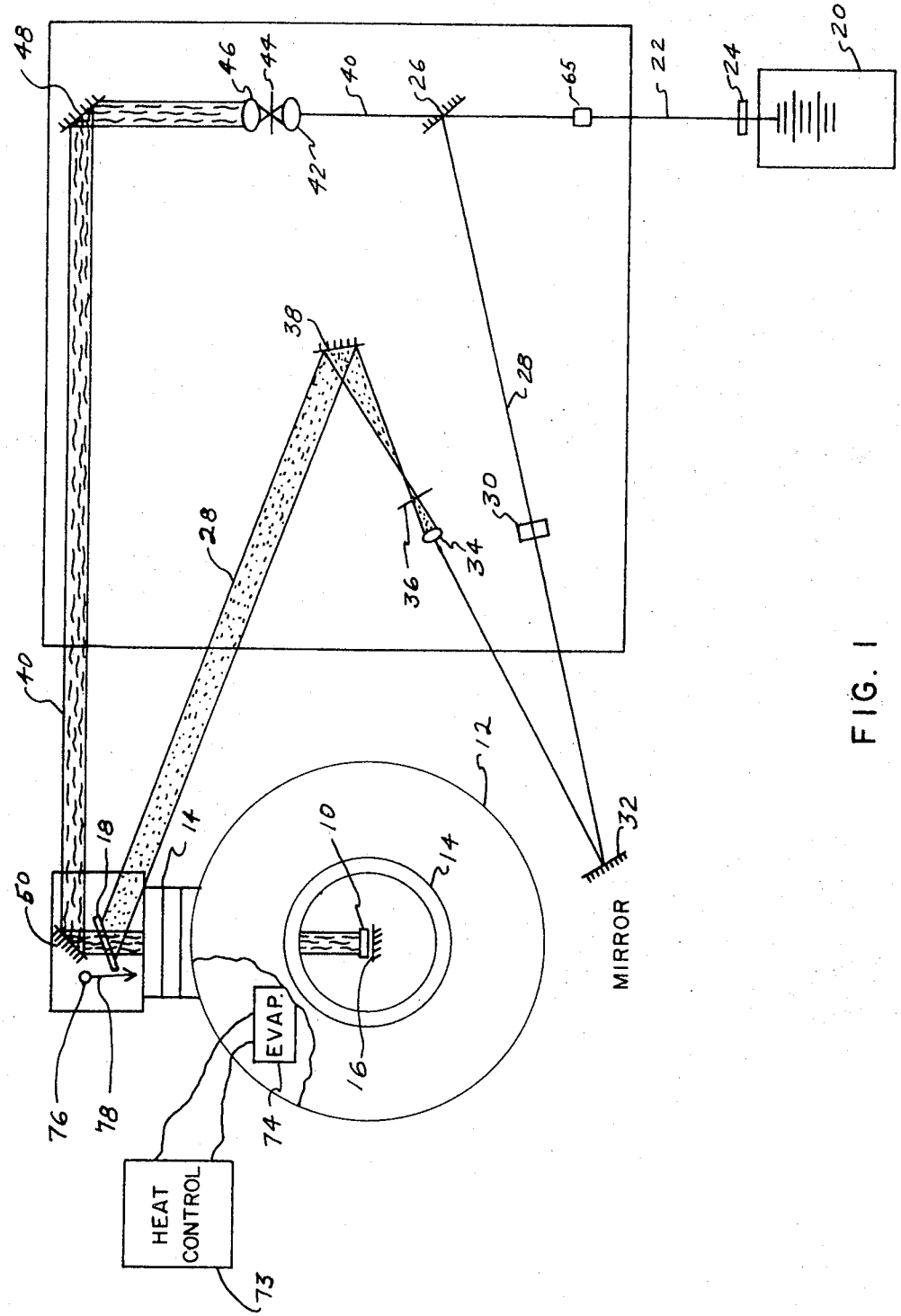
FIG. 1 is a schematic illustration of an embodiment of the invention.

The object or sample 10 upon which a thin film is to be deposited is placed within vacuum chamber 12. It is viewable through glass ports 14 of vacuum chamber 12, and, as shown, it is posijioned in front of a reflecting surface or mirror 16. Photographic plate 18 is positioned just outside of vacuum chamber 12 and is located and oriented to view sample 10. Helium-neon laser 20 projects a beam of coherent light 22 which is controlled by an "on-off" camera type shutter 24. This beam of light is split into two beams by beam splitter 26 and one of the beams, beam 28, is passed through phase plate 30. Phase plate 30 is of the adjustable type which optically delays the passage of beam 28 in the range of zero to 180°, depending upon its adjustment. From phase plate 30, beam 28 is reflected by mirror 32 to lens 34 which then focuses beam 28 through pinhole 36, at the focal point of lens 34, to mirror 38 which reflects beam 28 onto photographic plate 18. Beam 28 is of appropriate dimensions to substantially cover photographic plate 18.

Figure 3:
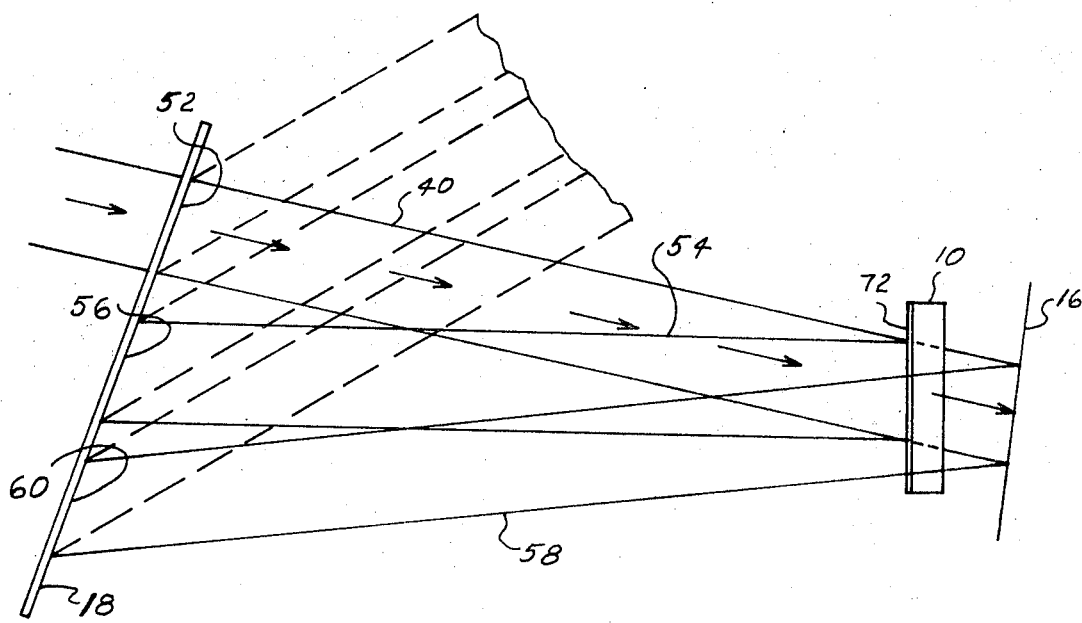
FIG. 3 is an enlarged schematic illustration of a portion of FIG. 1.

The second beam leaving beam splitter 26, beam 40, is focused by lens 42 through pinhole 44, at the focal point of lens 42, onto colummating lens 46. Colummating lens 46 colummates beam 40 into a beam of a dimension corresponding to the frontal area of sample 10 which beam is reflected via mirrors 48 and 50 through a region 52 of photographic plate 18 onto sample 10. A portion of light, labeled beam 54 (FIG. 3), is reflected by the surface of sample 10 onto an area of photographic plate 18 labeled region 56. This is accomplished by tilting sample 10 slightly. Assuming that sample 10 is transparent a portion of light from beam 40 will pass through sample 10 and reflected, as beam 58, by mirror 16, back through sample 10 to a third discrete region 60 of photographic plate 18.

Figure 2:
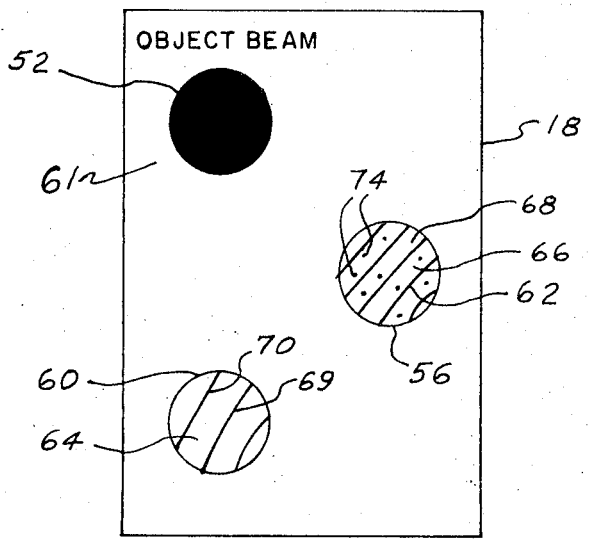
FIG. 2 is a photographic plate after exposure and development illustrating both transmission and reflection type holographic images.

Thus by opening shutter 24 for an appropriate exposure period, there will have been exposed on photographic plate 18 one or two holographic images, as the case may be. Such an image or images are the result of interference fringes developed between the direct irradiation of photographic plate 18 by laser 20 and the indirect irradiation of it by light from the same source but which has been directed onto and reflected from, or passed through, the sample. As shown in FIG. 2, which illustrates photographic plate 18 after development, region 52 is totally exposed as indicated by a totally black image 61, region 56 illustrates a "reflectance" hologram 62 and region 60 illustrates a "transmission" holograph 64.

The purpose of phase plate 30 is to permit the phase of illumination of one beam to be shifted 180° between successive exposures and thus the original data is cancelled out and only the change in data is seen. In this manner a more sensitive presentation is obtained. While phase plate 30 can be placed in either beam path, beam 28 or 40, it is usually preferably to place it in the path of the beam illuminating the whole of photographic plate 18, in this case beam 28. Beam director 65 consists of two adjustable mirrors which compensate for any difference in the laser height and height of the rest of the system.

Operation of the system may be in either of two modes. In one, a first exposure of photographic plate 18 is made of the original state of the object to be examined. Thereafter, the surface of the object is subjected to deposition of a film of material, e.g. by environmental deposition or deposition within a controlled environment. Finally, a second exposure is made on photographic plate 18 and the film thickness determined by developing the late and measuring the number or movement of the interference lines of the resulting hologram or holograms. For example, and with reference to FIG. 2, the distance between lines 66 and 68 of reflectance hologram 62 are representative of the film thickness. Assuming that sample 10 is transparent, there will also be provided transmission hologram 64 in which the distance between lines 69 and 70 are representative of near twice the thickness of film 72 on sample 10. The relationship between the lines of the two holograms are not precisely two-to-one because in the reflected case there is some penetration of the sample before reflection. However, this difference is repeatable and thus does not significantly effect accuracies of measured thicknesses. Particles 74 are reproduced in reflectance hologram 62 but not in transmission hologram 64. Thus in th case of transmission holograms this type of data is not reproduced. With phase plate 30 adjusted between exposures to shift phase 180°, the resulting holograms display only lines of changed thickness and thus only the added film 72 is represented by the holograms.

In the second mode of operation of the system, the first exposure is made prior to the deposition of material on the object, photographic plate 18 developed, and replaced in its original position. Thereafter sample 10 and photographic plate 18 are illuminated by coherent beams 28 and 40 and the deposition of material on sample 10 commenced. This is accomplished by operating, for example, heat control 73 to cause evaporator 74 to increase temperature and evaporate material which then forms on sample 10. The back side of photographic plate 18 is then continuously viewed from point 76 along line 78 during the deposition process, and the development of interference lines, either from a reflection image or a transmission image observed. When the movement of the lines indicates a desired film thickness, heat control 73 is operated to reduce the temperature of evaporator 74 and the deposition process is stepped. Thus in this mode of operation of the invention, it provides an extremely accurate means of obtaining a desired film thickness.

What is claimed is:

1. A thin film analyzer for determining the thickness of a film on an object comprising:
   A. a source of coherent light;
   B. a beam splitter to which a beam of light from said source of coherent light is directed for providing as an output first and second beams of coherent light;
   C. a photographic plate positioned for viewing said object;
   D. light columnmating means;
   E. first optical means responsive to said first beam of coherent light for directing said first beam onto and over the thus illuminated area of said photographic plate;
   F. second optical means responsive to said second beam of coherent light for directing said second beam through said columnmating means and through a first discrete area of said photographic plate onto said object from which it is reflected back to a second discrete area of said photographic plate which is within said illuminated area;
   G. A mirror adapted to be positioned behind a said object with respect to said photographic plate and wherein light passing through said object is reflected back through the object to a third discrete area of said photographic plate within said illuminated area and spaced from said second discrete area;
   H. a vacuum chamber surrounding said object;
   I. a source of material positioned within said vacuum chamber and including deposition means for causing said material to be deposited on the surface of said object; and
   J. control means acting on said deposition means for selectively controlling the deposition of material from said source of material onto a said object;
   whereby two successive exposures of light directed onto said object and reflected back to said photographic plate provide an indication of thickness of film deposited on said object between said exposures, the photographic plate being developed after one of said exposures.

2. A thin film analyzer as set forth in claim 1 further comprising optical phase shift means interposed in the path of one of said first and second beams leaving said beam splitter.

3. A thin film analyzer as set forth in claim 2 wherein said optical phase shift means is interposed in the path of said first beam and comprises means for varying the phase shift of said beam as a beam passes through it.

4. A thin film analyzer as set forth in claim 3 further comprising shutter means positioned to interrupt the output of said source of coherent light for selectively controlling the period of exposure of said beams on said photographic plate and said object.

* * * * *